(12) United States Patent
Sewell

(10) Patent No.: US 10,059,389 B2
(45) Date of Patent: Aug. 28, 2018

(54) TRACKED VEHICLE

(71) Applicant: The Charles Machine Works, Inc., Perry, OK (US)

(72) Inventor: Cody L. Sewell, Perry, OK (US)

(73) Assignee: The Charles Machine Works, Inc., Perry, OK (US)

( * ) Notice: Subject to any disclaimer, the term of this patent is extended or adjusted under 35 U.S.C. 154(b) by 0 days.

(21) Appl. No.: 15/433,077

(22) Filed: Feb. 15, 2017

(65) Prior Publication Data

US 2017/0166270 A1    Jun. 15, 2017

Related U.S. Application Data

(63) Continuation of application No. 14/706,345, filed on May 7, 2015, now Pat. No. 9,586,635.

(60) Provisional application No. 61/989,942, filed on May 7, 2014.

(51) Int. Cl.
| | |
|---|---|
| *B62D 55/12* | (2006.01) |
| *B62D 55/10* | (2006.01) |
| *B62D 55/15* | (2006.01) |
| *B62D 55/24* | (2006.01) |
| *B62D 55/30* | (2006.01) |

(52) U.S. Cl.
CPC ............ *B62D 55/12* (2013.01); *B62D 55/10* (2013.01); *B62D 55/15* (2013.01); *B62D 55/24* (2013.01); *B62D 55/30* (2013.01)

(58) Field of Classification Search
CPC ..... B62D 55/084; B62D 55/10; B62D 55/104
See application file for complete search history.

(56) References Cited

U.S. PATENT DOCUMENTS

| | | |
|---|---|---|
| 1,804,816 A | 5/1931 | Shelton |
| 1,815,839 A | 7/1931 | Ferguson |
| 1,862,329 A | 6/1932 | Carden |
| 2,277,855 A | 3/1942 | Mercier |
| 3,082,637 A | 3/1963 | Paxton |
| 3,265,146 A | 8/1966 | Tucker |
| 3,583,509 A | 6/1971 | Stachnik |
| 3,730,287 A | 5/1973 | Fletcher |
| 3,937,289 A | 2/1976 | Dickinson |
| 3,946,822 A | 3/1976 | Dohse et al. |
| 4,072,203 A | 2/1978 | Pierson |
| 4,361,363 A | 11/1982 | Livesay |

(Continued)

FOREIGN PATENT DOCUMENTS

| | | |
|---|---|---|
| CA | 2509440 A1 | 12/2005 |
| DE | 329220 A | 11/1920 |

(Continued)

*Primary Examiner* — Kevin Hurley
(74) *Attorney, Agent, or Firm* — Tomlinson McKinstry, P.C.

(57) ABSTRACT

A track system for steerable vehicles having at least one axle. The track system is capable of adjusting to changes in terrain by pivoting in clockwise and counterclockwise directions relative to an axle assembly as the vehicle moves across the ground. The pivotal movement of the track system relative to the axle assembly is restricted by a limiter attached to an inboard member of the track system frame. Pivotal movement is limited by the axle assembly housing engaging the limiter when the track system pivots in either a clockwise or counterclockwise direction to a maximum point along a pivot arc.

4 Claims, 8 Drawing Sheets

(56) References Cited

U.S. PATENT DOCUMENTS

| | | |
|---|---|---|
| 4,454,925 A | 6/1984 | Oswald |
| 4,579,182 A | 4/1986 | Dewing |
| 4,953,919 A | 9/1990 | Langford |
| 4,966,242 A | 10/1990 | Baillargeon |
| 5,607,210 A | 3/1997 | Brazier |
| 5,924,503 A | 7/1999 | Lykken |
| 6,132,133 A | 10/2000 | Muro et al. |
| 6,135,220 A | 10/2000 | Gleasman |
| 6,199,646 B1 | 3/2001 | Tani |
| 6,213,490 B1 | 4/2001 | Lykken |
| 6,374,933 B1 | 4/2002 | Ruppert, Jr. |
| 6,487,460 B1 | 12/2002 | Lemke |
| 6,601,664 B2 | 8/2003 | Hiraki et al. |
| 7,108,333 B1 | 9/2006 | Kirchenwitz et al. |
| 7,222,924 B2 | 5/2007 | Christianson |
| 7,708,092 B2 | 5/2010 | Despres |
| 8,430,186 B2 | 4/2013 | Hansen |
| 8,430,188 B2 * | 4/2013 | Hansen .................. B62D 55/04 180/9.26 |
| 2006/0060395 A1 | 3/2006 | Boivin |
| 2007/0240917 A1 | 10/2007 | Duceppe |
| 2010/0012399 A1 | 1/2010 | Hansen |
| 2010/0139994 A1 | 6/2010 | Hansen |
| 2015/0129329 A1 | 5/2015 | Cox |

FOREIGN PATENT DOCUMENTS

| | | |
|---|---|---|
| DE | 20000737 U1 | 4/2000 |
| DE | 20015204 U1 | 1/2001 |
| FR | 1515402 | 3/1968 |
| GB | 124450 A | 4/1919 |
| GB | 127329 A | 6/1919 |
| GB | 925032 A | 5/1963 |
| GB | 2159112 A | 11/1985 |
| NL | 19248 C | 7/1923 |
| WO | 2006066406 A1 | 6/2006 |

* cited by examiner

TRACKED VEHICLE

CROSS REFERENCE TO RELATED APPLICATION

This application is a continuation of U.S. patent application Ser. No. 14/706,345, filed May 7, 2015, which claims the benefit of U.S. Provisional Patent Application Ser. No. 61/989,942 filed on May 7, 2014, the entire contents of which are incorporated herein by reference.

FIELD

The present invention is directed to vehicles and more specifically track systems used on vehicles.

SUMMARY

The present invention is directed to a track system comprising a drive sprocket, a hub, a frame, an endless track, a limiter, and an axle assembly. The drive sprocket has an inboard side and an outboard side. The hub is connected to the drive sprocket on the outboard side. The frame is configured to support the hub to allow rotation of the sprocket relative to the frame. The endless track is supported on the drive sprocket. Rotation of the drive sprocket drives movement of the endless track. The limiter is connected to the frame on the inboard side of the drive sprocket. The axle assembly is on the inboard side of the drive sprocket and comprises an axle and housing. The axle is connected to the drive sprocket and rotatable relative to the housing. A portion of the housing is disposed within the limiter so that movement of the frame relative to the housing is limited by the housing engaging the limiter.

The invention is likewise directed to a vehicle comprising a chassis, an engine supported on the chassis, an axle assembly, a drive sprocket, a track frame, a hub, an endless track, and a limiter. The axle assembly comprises an axle and housing supported on the chassis. The axle is rotatable relative to the housing in response to operation of the engine. The drive sprocket has an inboard side and an outboard side. The drive sprocket is connected to the axle on the inboard side of the drive sprocket and rotatable in response to rotation of the axle. The hub is supported by the track frame and connected to a hub side of the drive sprocket to allow the drive sprocket to rotate relative to the track frame. The hub has an axis of rotation. The endless track is supported on the drive sprocket. Rotation of the drive sprocket drives movement of the endless track to propel the chassis. The limiter is supported on the track frame. A portion of the housing is disposed within the limiter so that movement of the track frame relative to the housing is limited by the housing engaging the limiter.

The present invention is further directed to a track system for attachment to an axle assembly of a vehicle. The axle assembly comprises an axle rotatable about a drive axis and a housing that pivots about a steering pivot axis. The vehicle has a steering arm connected to the housing for pivoting the housing about the pivot axis to steer the vehicle. The track system comprises a frame, a drive sprocket, a hub, an endless track, and a limiter. The frame has a first end and a second end. The frame also has an inboard member and an outboard member that both extend between the first end and the second end. The drive sprocket is disposed between the inboard member and the outboard member and is rotatable relative to the frame about the drive axis in response to rotation of the axle about the drive axis. The hub is connected to the drive sprocket and to the outboard member of the frame. The hub allows the drive sprocket to rotate relative to the frame about the drive axis and allows the frame to pivot clockwise and counterclockwise about the drive axis. The endless track is supported on the drive sprocket so that rotation of the drive sprocket about the drive axis drives movement of the endless track. The limiter is supported on the inboard member of the frame. A portion of the housing is disposed within the limiter so that movement of the frame in the clockwise direction and the counterclockwise direction is limited by the housing engaging the limiter.

DETAILED DESCRIPTION

Tracked vehicles are often used to travel across rugged terrain. Such terrain may include mud, sand, snow, or unstable ground. Tracked vehicles are sometimes preferred over wheeled vehicles because of the terrain and sometimes because tracks tend to spread the weight of the vehicle they are attached to out across a broader surface area. Spreading the weight of the vehicle out using tracks increases traction while often decreasing the likelihood that ruts or other surface damage will occur. For these reasons tracked vehicles have been popular in the agricultural and construction industries where large vehicles weighing several thousand pounds are often used. Tracked vehicles have likewise become popular in colder climates to travel through snow and ice. Such tracked vehicles may include those sold to consumers with tracks installed or wheeled vehicles such as pick-up trucks or tractors that have had the tires removed and track systems put on in place of the tires. These track systems have been effective. However, there remains a need for improved track systems for vehicles.

Figure 1:
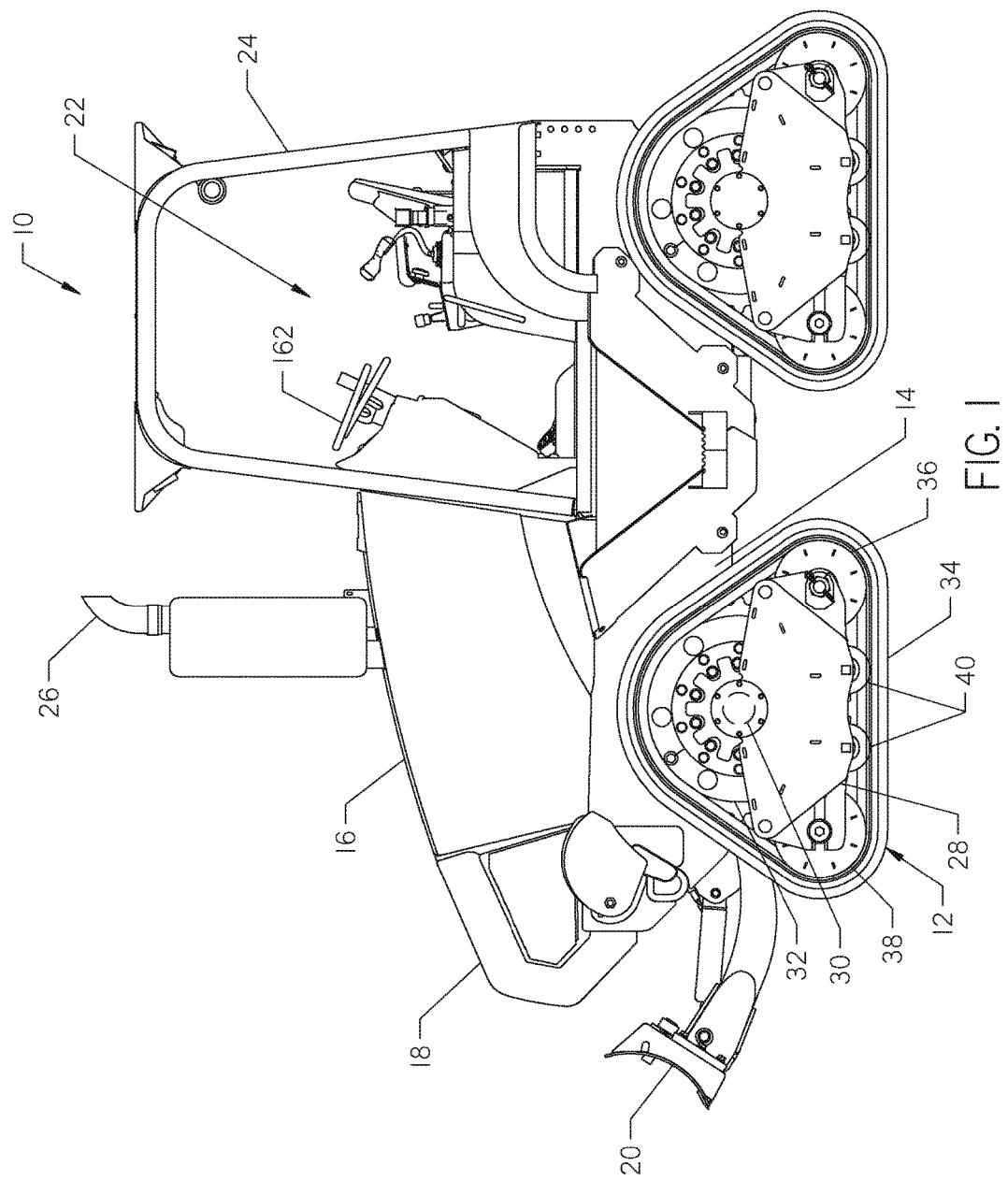
FIG. 1 is a diagrammatic representation of a vehicle having a track system of the present invention.

Turning to FIG. 1, there is shown therein a vehicle 10 comprising a track system 12. The vehicle 10 preferably has four track systems that function similarly to traditional wheels. As discussed hereinafter, each track system may pivot about a vertical steering axis to allow the operator to change direction of the vehicle as it travels over the ground. The vehicle comprises a chassis 14 that provides the structural backbone of the vehicle. The chassis 14 supports an engine (not shown) that is covered by a hood 16 on a front portion of the chassis. The engine may comprise a conventional internal combustion engine. Weights 18 may be positioned at the front of the chassis 14 to provide a counter weight to an attachment (not shown) such as a trencher, plow, or earth saw, supported at the rear end of the chassis.

A work tool 20 may be supported at the front end of the chassis and may comprise a hydraulically actuated backfill blade. An operator station 22 may be located near the rear end of the chassis 14 and may be surrounded by a Rollover Protective Structure ("ROPS") 24. An exhaust pipe 26 extends from the engine, through the hood 16 and directs engine exhaust over the operator station 22 and ROPS 24.

The track system 12 comprises a frame 28, a hub 30 supported on the frame, a drive sprocket 32, an endless track 34, a first end roller 36, and a second end roller 38. Bogie rollers 40 are connected to the frame 28 and disposed between the first end roller 36 and the second end roller 38. As shown in FIG. 1, the endless track 34 may be routed around the drive sprocket 32, the first end roller 36 and the second end roller 38 to have a generally triangular profile. One skilled in the art will appreciate that track system 12 may have additional rollers positioned to change the profile of the track system. For example, an additional roller could be added to cause the track 34 to have a quadrilateral profile.

Figure 2:
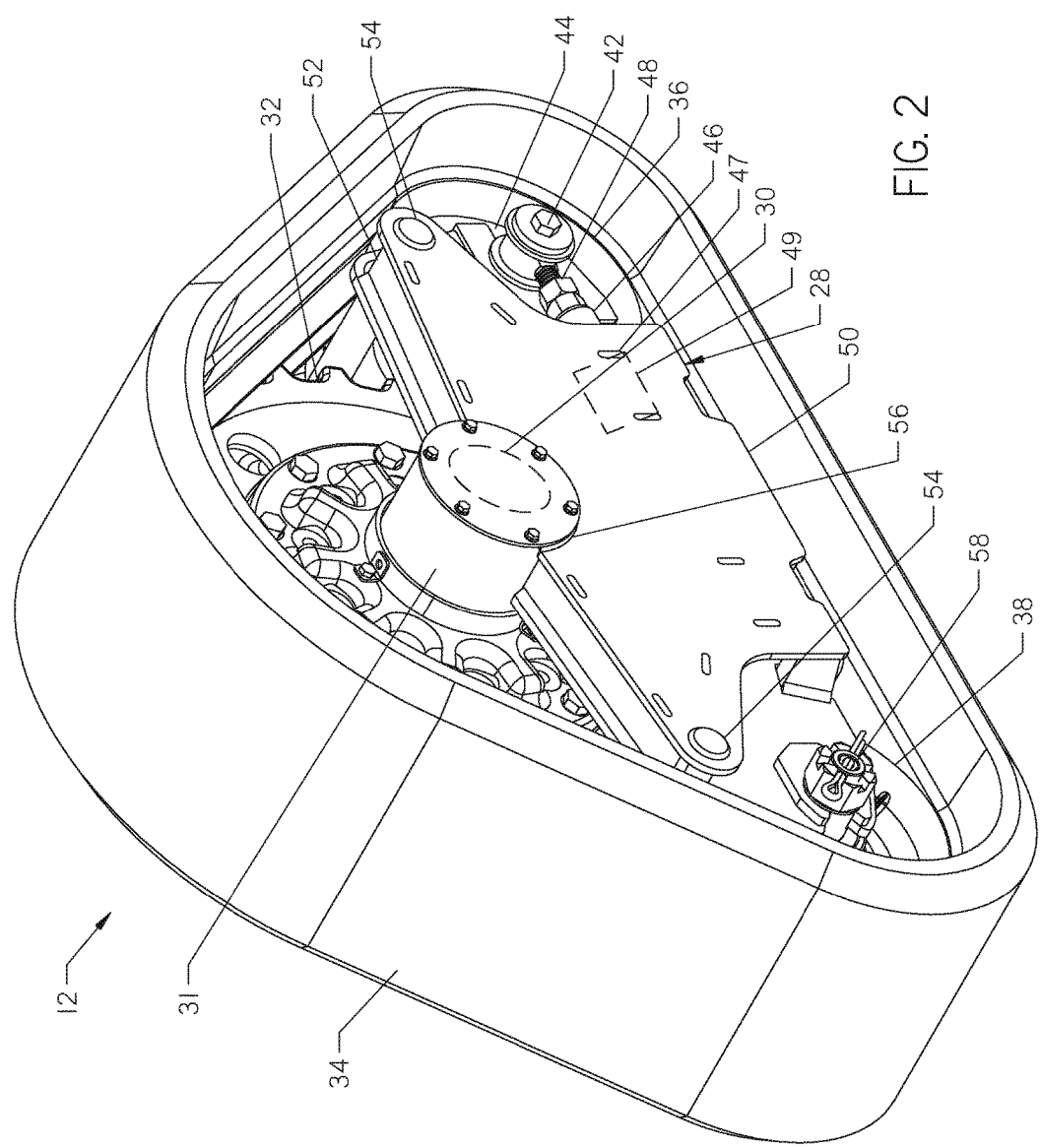
FIG. 2 is an isometric view of the track system of FIG. 1 from an outboard view point.
Figure 4:
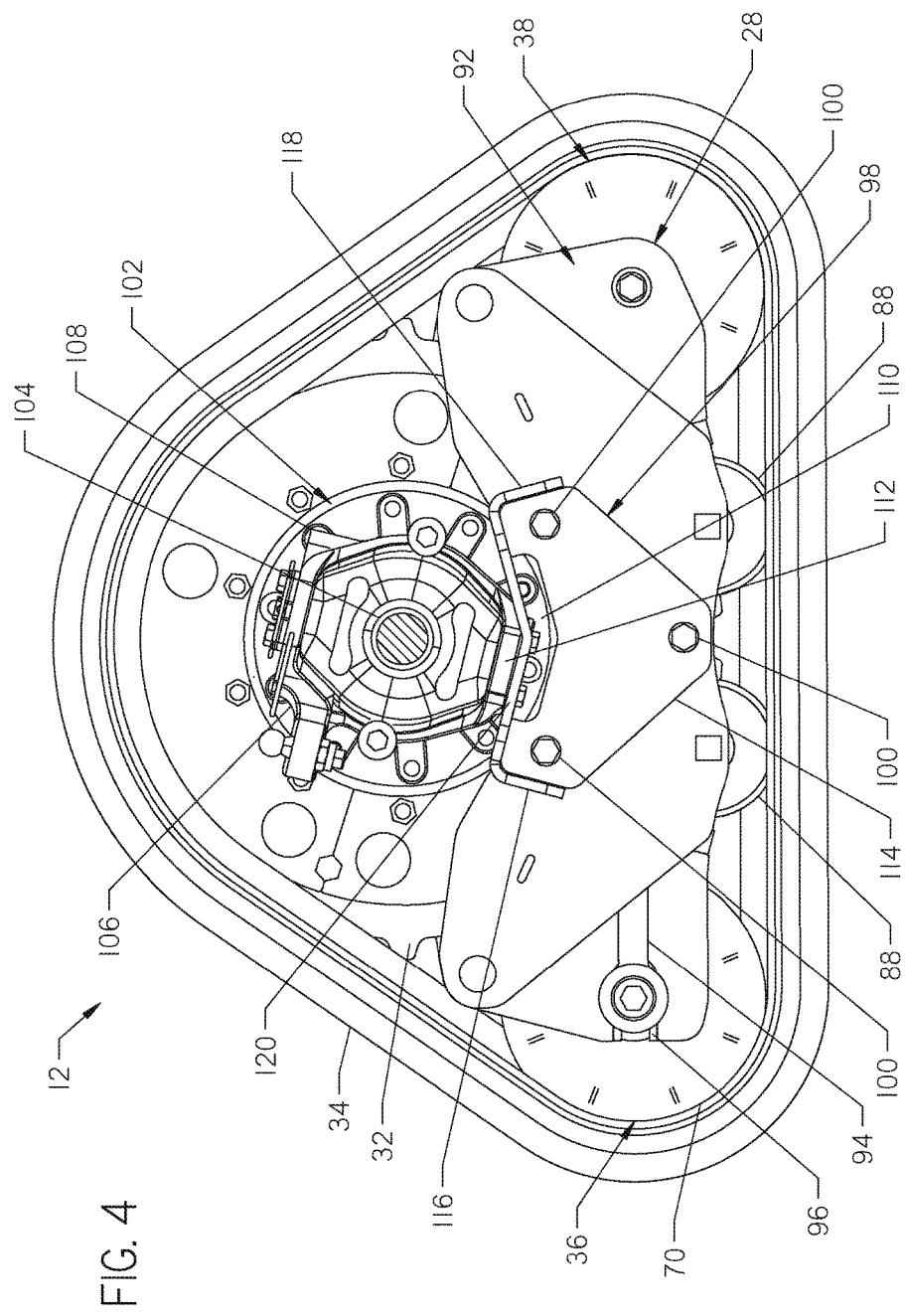
FIG. 4 is an inboard view of the track system shown in FIG. 3 with the track frame pivoted counter-clockwise relative the axle housing.

Turning to FIG. 2, the outboard side of the track system 12 of the present invention is shown. The track system 12 comprises the endless track 34, the drive sprocket 32, the frame 28, and the hub 30. First end roller 36 is shown at a first end of the frame 28 and second end roller 38 is shown at a second end of the frame. The frame 28 comprises an outboard frame assembly 50 and an inboard frame assembly 92 (FIG. 4). The outboard frame assembly 50 may comprise two spaced-apart plates connected by a bracket 52. Bracket 52 covers the top of the space between the two plates of the outboard frame assembly 50 and provides structural support for the frame. Struts 54 disposed at both the first end and the second end of the frame 28 also connect the two plates and provide structural support for the frame 28. The frame 28 supports the hub 30 within a hub housing 31 disposed in a semi-circular notch 56. The hub 30 permits the drive sprocket 32 to rotate relative to the frame 28 and allows the frame to pivot in clockwise and counterclockwise directions relative to the chassis 14 (FIG. 1).

The track 34 is routed around the drive sprocket 32, the first end roller 36 and the second end roller 38 to have a generally triangular profile. Accordingly, the apex of the triangle is formed by the engagement of the track 34 with a top portion of the drive sprocket 32. The bottom vertices of the triangular track are supported on the first end roller 36 and the second end roller 38 which are disposed at the base of the triangular profile.

The first end roller 36 comprises a wheel supported on an axle 42. The axle 42 is supported by the frame within a slot 44 formed in the first end of the outboard frame assembly 50. A tension adjustment mechanism 46 is connected to the axle 42 and configured to move the axle within slot 44 to adjust tension on the track 34. The tension adjustment mechanism 46 may comprise a linear actuator such as a fluid driven cylinder or spring. In the preferred embodiment, the tension adjustment mechanism 46 comprises a jackscrew connected to the axle 42 at a first end and the frame 28 at a second end. The jackscrew may be adjusted to increase or decrease the tension (tightness) of track 34. A tension window 47 provides a view of a portion of the tension adjustment mechanism 46 disposed between the plates of either inboard frame member 92 or outboard frame member 50 to assist in adjusting the tension on the track 34 a desired amount. Once the desired track tension is achieved, a lock nut 48 may be threaded down to lock the jackscrew. A jackscrew is advantageous because when locked in place by lock nut 48 the jackscrew will remain motionless and will not unwind and release the tension on the track. A second jackscrew may be disposed on the inboard side of the drive sprocket to balance the load applied to the axle 42 and will be discussed hereinafter. A urethane spring 49 may be disposed at the second end of the jackscrew. Urethane spring 49 assists in absorbing shock forces exerted on the first end roller 36 by the ground and obstructions thereon as the track system 12 moves across the ground.

The second end roller 38 comprises a wheel disposed at the second end of the frame 28 and is supported on an axle 58 to allow rotation of the second end roller in response to movement of the track 34 about the triangular profile as the vehicle travels across the ground.

Figure 3:
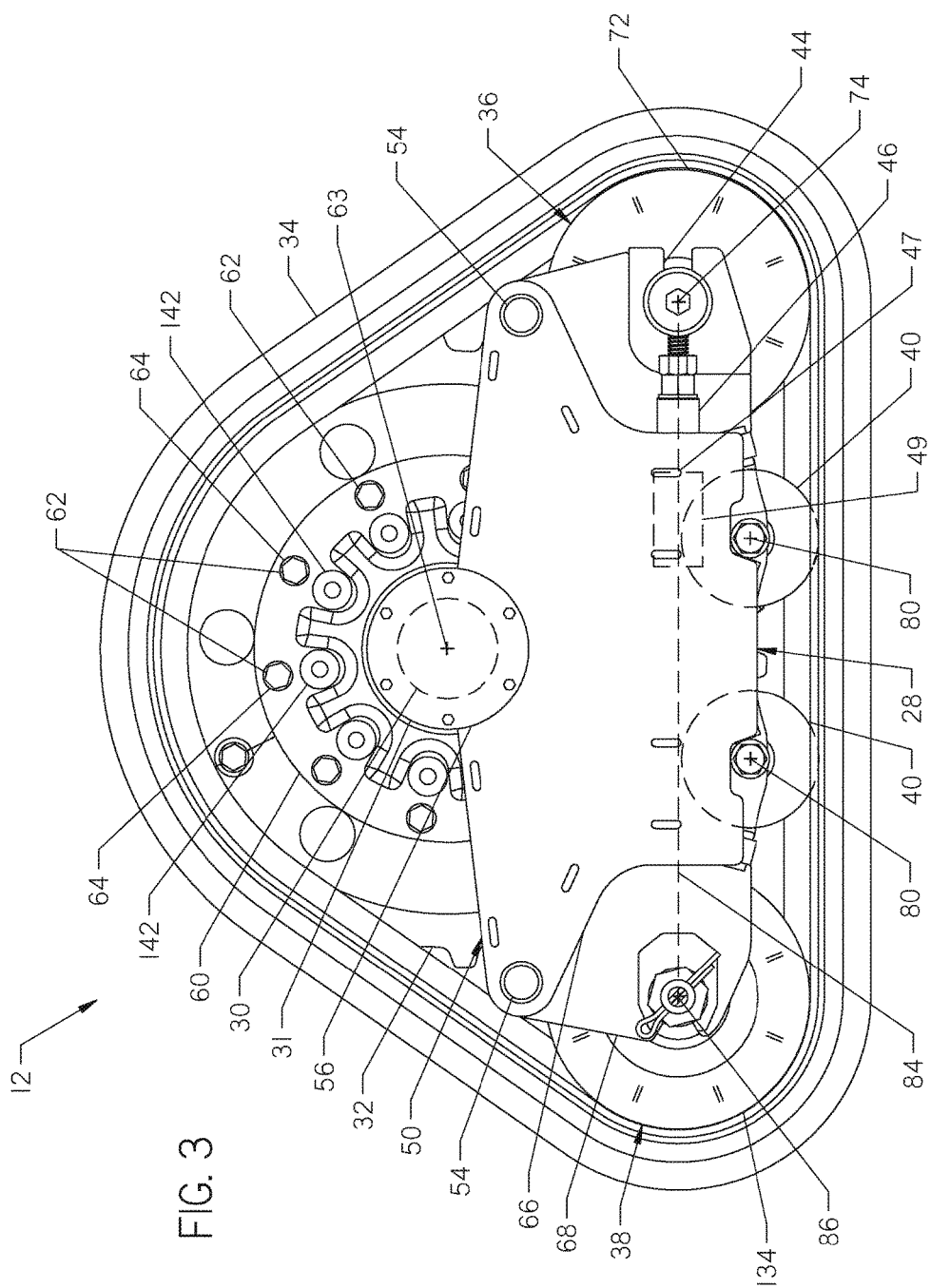
FIG. 3 is an outboard view of the track system of FIG. 1.

With reference now to FIG. 3, the track system 12 of FIG. 2 is shown from the outboard side. The outboard side of drive sprocket 32 is shown connected to hub 30. The drive sprocket 32 may comprise a single piece sprocket or as shown may comprise a plurality of segments joined using track hub 60. The track hub 60 comprises a single circular piece of steel that is used to connect the drive sprocket 32 to the hub 30 and a yet to be described drive hub. The drive sprocket 32 is connected to the track hub 60 with a plurality of bolts 62 that are disposed in bolt holes 64 formed in the track hub 60. Bolt holes 64 are aligned with corresponding bolt holes (not shown) in the drive sprocket and the bolts 62 are placed in the bolt holes to fasten the drive sprocket 32 to the track hub 60.

The track hub 60 supports the hub 30. Hub 30 is disposed within housing 31 and permits the drive sprocket 32 and track hub 60 to rotate relative to the track frame 28 about an axis of rotation 63. The hub 30 is connected to hub housing 31 which is connected to frame 28 and supported within a semi-circular notch 56 formed on the outboard frame assembly 50 of the track frame.

The outboard frame assembly 50 comprises an outer member 66 and an inner member 68. Outer member 66 and inner member 68 may be fastened together using the top bracket 52 (FIG. 2) and with struts 54. One skilled in the art will appreciate that additional connection points between outer member 66 and inner member 68 may exist to provide structural support.

The first end roller 36 is supported at a first end of the track frame 28 by inner member 68. The first end roller 36 may comprise an inner wheel 70 (FIG. 4) and an outer wheel 72. The inner wheel 70 and the outer wheel 72 are both supported on an axle (not shown). The axle supports the inner wheel 70 on the inboard side of the drive sprocket 32 and the outer wheel 72 on the outboard side of the drive sprocket. The axle is supported within the slot 44 and allows the axle to move relative to the frame to adjust tension on the track 34 in response to operation of the track tension mechanism 46. The first end roller 36 is rotatable about an axis 74 defined by the axle.

Bogie rollers 40 are supported on the inner member 68 of the outboard frame assembly 50 of the track frame 28. The bogie rollers 40 are supported at a bottom portion of the inner member 68 to engage the base of the track 34. Bogie rollers 40 provide additional support for the portion of the track 34 that spans the distance between the first end roller 36 and the second end roller 38. Bogie rollers 40 are freely rotatable about an axis of rotation 80 in response to movement of the track. Both bogie rollers 40 are disposed entirely below a line segment 84 having a first endpoint at the first end roller's axis of rotation 74 and a second endpoint at an axis of rotation 86 about which the second end roller 38 rotates. Bogie rollers 40 may be supported on a cantilevered axle so that drive sprocket 32 is able to pass between bogie rollers 40 on the outboard frame assembly 50 and bogie rollers 88 (FIG. 4) supported on the inboard frame assembly 92 discussed hereinafter. This configuration allows for a lower profile and more compact track system 12.

Turning now to FIG. 4, the inboard side of track system 12 is shown. The track frame comprises an inboard frame assembly 92 disposed on an inboard side of the drive sprocket 32. The inboard frame assembly 92 supports bogie rollers 88 and provides support for the axle (not shown) that the first end roller 36 is supported on and the axle (not shown) that the second end roller 38 is supported on. An inboard tension adjust mechanism 94 is supported on the inboard frame assembly 92 and works in concert with tension adjustment mechanism 46 (FIG. 3) to move the axle in slots 44 (FIG. 3) and 96 to adjust tension on the track 34.

A limiter 98 is connected to the frame on the inboard side of the drive sprocket 32. The limiter 98 may be fastened to the inboard frame assembly 92 with three bolts 100. The limiter 98 is disposed below an axle assembly 102.

The axle assembly 102 is positioned on the inboard side of the drive sprocket 32 and comprises an axle 104 and a housing 106. The axle 104 is attached to an inboard drive hub 108 to drive rotation of the inboard hub and sprocket. The drive sprocket 32 and track hub 60 (FIG. 3) are bolted to the inboard drive hub 108 to transfer rotational force from the axle to the drive sprocket. If the axle 104 is not a drive axle; the drive sprocket 32, track hub 60, inboard drive hub 108 and axle all simply rotate together as the vehicle is driven. The axle 104 and inboard drive hub 108 are rotatable relative to the housing 106. A lower portion of the housing 106 is disposed within the limiter 98 so that movement of the frame 28 relative to the housing is limited by the housing engaging the limiter. The limiter 98 may comprise an opening 110 having an edge. The housing 106 may be partially disposed within the opening 110. When the track frame 28 is rotated in a clockwise direction relative to the housing 106, as shown in FIG. 4, the lower portion of housing 106 will engage the edge of the opening 110 and limit further rotation of the frame relative to the housing. When the frame 28 is rotated in a counterclockwise direction the housing will engage the opposing side of the opening 110 and limit rotation of the frame relative to the housing in a counterclockwise direction. The portion of the housing 106 disposed within the limiter is a bottom side 112 of the housing configured to engage the edge of the opening 110.

The limiter may comprise a flange 114 to connect the limiter to the inboard frame member 92 with bolts 100. The flange 114 may be disposed in a vertical plane and the opening 110 may be generally disposed in a horizontal plane. The limiter 98 may comprise a first wing 116 and a second wing 118. The first and second wings 116, 118 may define the opening 110. Thus, the bottom side 112 of the housing 106 may be disposed between the first wing 116 and the second wing 118. The first wing 116 and the second wing 118 may be connected by a bridge 120. The first wing 116, the second wing 118, and the bridge 120 may define the opening 110 within which the bottom side 112 of the housing 106 is disposed. As shown in FIG. 4, the combination of first and second wings 116, 118 and bridge 120 may have a generally elongated M-shaped profile that is disposed in a horizontal plane or orientation.

Figure 5:
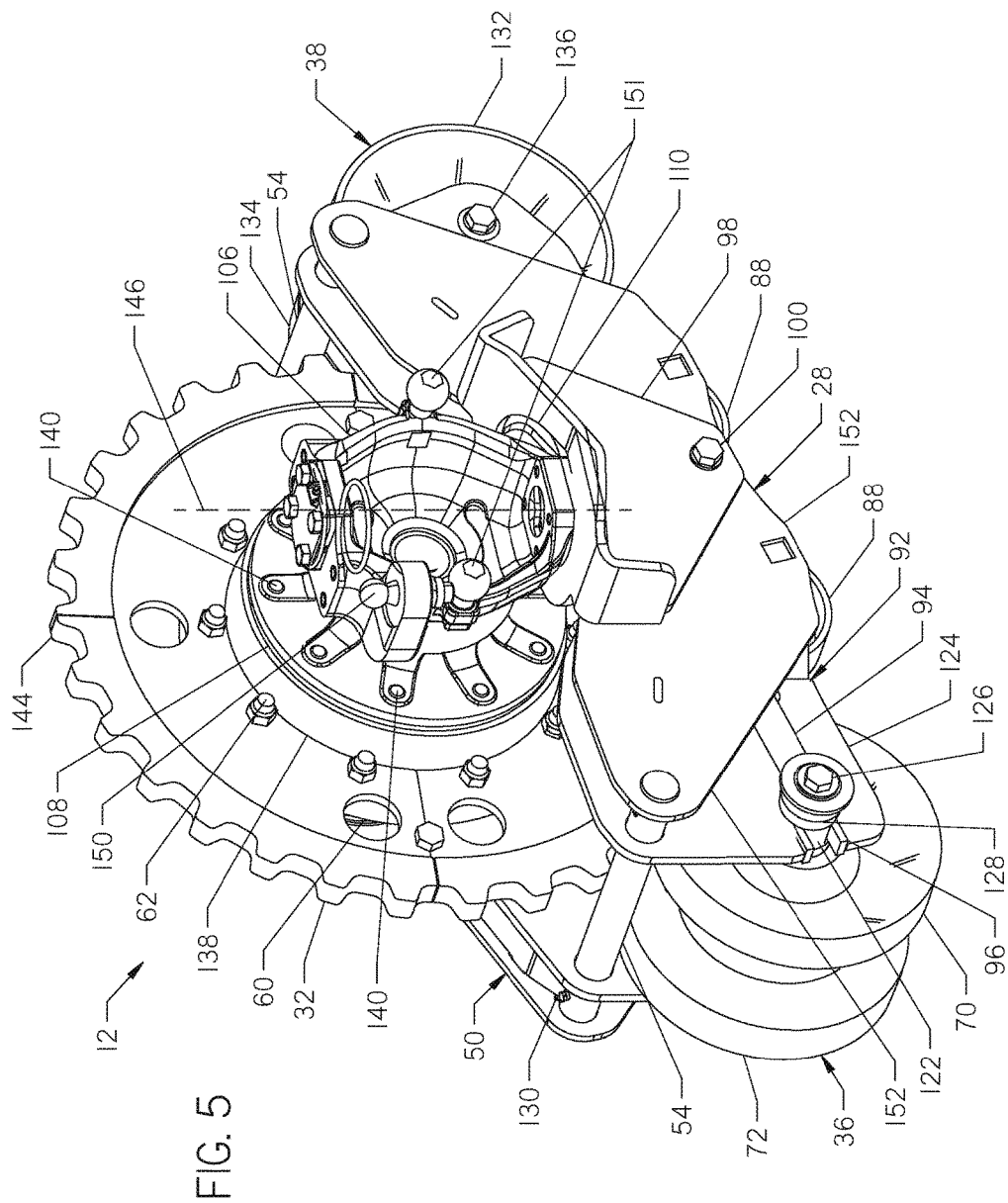
FIG. 5 is an inboard view of the track system shown in FIG. 4 with the track removed.

Turning now to FIG. 5, the track assembly 12 is shown from the inboard side with the track removed for clarity. The first end roller 36 comprising inner wheel 70 and outer wheel 72 is shown supported on a first end of the track frame 28. The first end roller 36 is supported within slots 96 and 44 (FIG. 2) by axle 122. The axle 122 is secured to the inner plate 124 of the inboard frame assembly using a bolt 126 and spacers 128. Wheels 70 and 72 are configured and placed on axle 122 so that a portion of drive sprocket 32 is disposed between the inner wheel 70 and the outer wheel 72. First end roller 36 is positioned below strut 54. Strut 54 secures the inboard frame assembly 92 of the frame to outboard frame assembly 50 and may provide a fluid passage for distributing fluid between tension adjustment mechanisms 46 (FIG. 2) and 94 to provide substantially even pressure to both ends of axle 122 on the inboard and outboard side of drive sprocket 32. Such a fluid passage is used only if a fluid driven linear actuator is used to adjust track tension. An inlet 130 may provide a means for the input and removal of fluid from the track tension adjustment system.

The second end roller 38 is supported at the second end of the frame 28 and comprises an inner wheel 132 and an outer wheel 134 (FIG. 3). The inner wheel 132 and outer wheel 134 are supported on an axle (not shown) that is fastened to the inner plate 124 of the frame 28 with bolts 136. Wheels 132 and 134 are configured and supported on the axle so that at least a portion of drive sprocket 32 may be disposed between wheel 132 and wheel 134. A strut 54 is also used at the second end of the frame 28 to secure the inboard frame assembly 92 to the outboard frame assembly 50.

As previously described, the limiter 98 is secured to the inboard frame assembly 92 of the frame. However, one skilled in the art will appreciate that the limiter 98 could be integral with the inboard member. For example, an outer plate 152 of the inboard frame assembly 92 may comprise a single piece of plate metal that has the limiter outline cut into it and then formed by bending the limiter portion of the plate into a desired shape. FIG. 5 shows that the opening 110 of the limiter may have a generally circular shape when viewed from above.

The drive sprocket 32 is connected to the frame 28 via the hub 30 (FIG. 2) supported on the outboard frame assembly 50. Track hub 60 is connected to the hub 30 and to the drive sprocket 32 using bolts 62. The drive sprocket 32 may comprise two half-circle pieces that are fastened to the track hub 60 and a spacer 138 to form a circular drive sprocket. The spacer 138 is connected to inboard drive hub 108. Inboard drive hub 108 is circular and comprises a plurality of studs 140 spaced about the drive hub that extend outward from the drive hub 108 toward the outboard side of the drive sprocket 32. The spacer 138 and drive sprocket 32 both have a plurality of holes corresponding to the location of the studs 140 so that the track hub and drive sprocket may be supported on the studs for rotation with the inner drive hub 108. Lug nuts 142 (FIG. 3) may be threaded onto each stud 140 to secure the drive sprocket 32 and the spacer 138 to the inner drive hub 108 for rotation therewith.

The axle 104 (FIG. 4) is connected to the inner drive hub 108 and drives rotation of the drive sprocket 32 and the track 34 (FIG. 1) which engages teeth 144 disposed about the periphery of the drive sprocket. The axle 104 is disposed within the housing 106. The housing 106 is supported on the chassis of the vehicle and able to pivot about a vertical steering axis 146 to allow the operator to turn the track system 12 when steering the vehicle with steering wheel 162 (FIG. 1).

The axle housing 106 is pivotally mounted to the axle along the generally vertical steering axis 146 and may be pivoted about the axis using a steering arm 148 (FIG. 6) that is operatively connected to a steering knuckle 150. Pivotal movement of the housing 106 about the pivot axis 146 may be limited by a pair of stops 151 that project inward toward the chassis from the housing 106.

Figure 6:
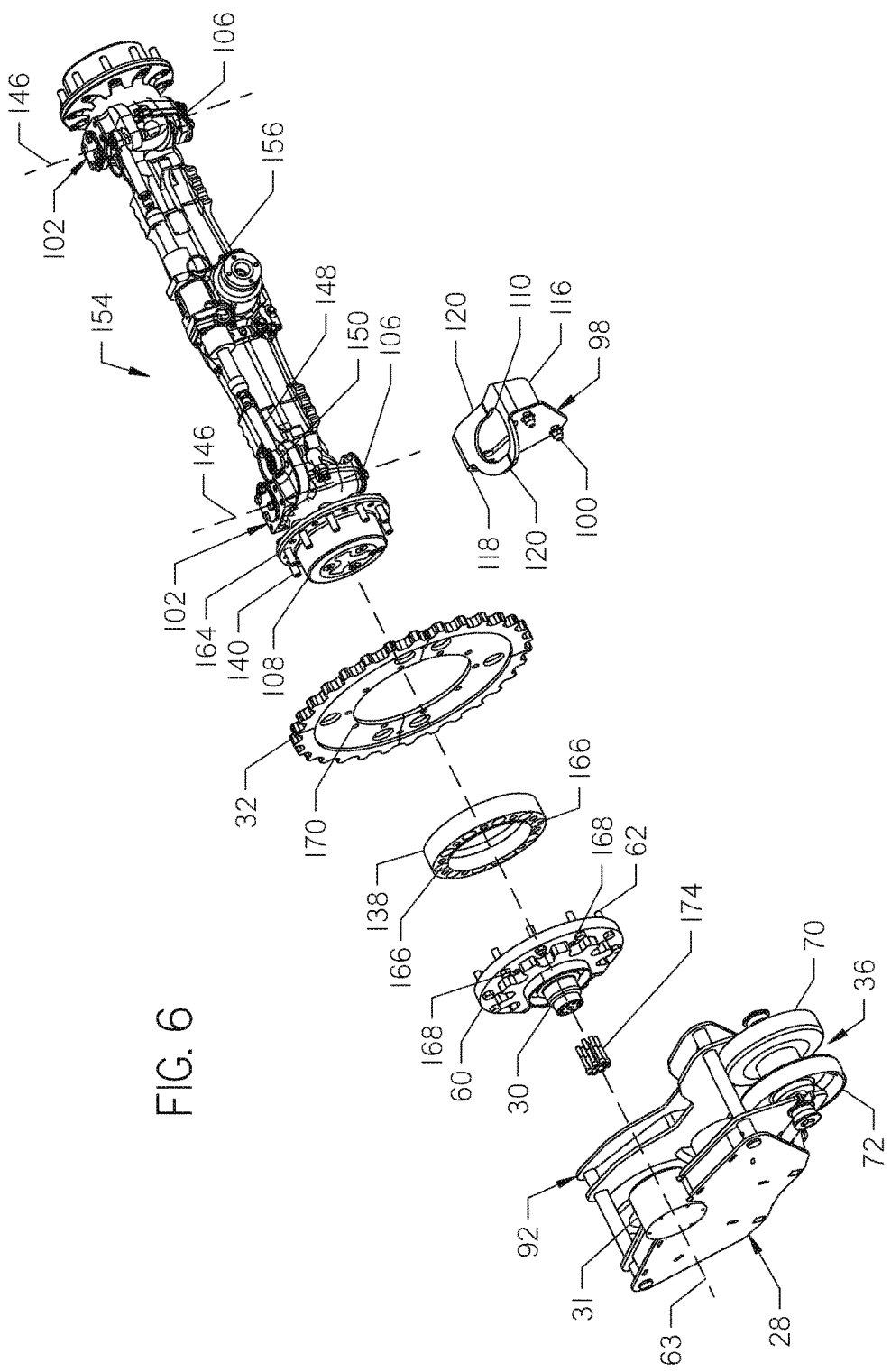
FIG. 6 is a partially exploded view of the track system of the present invention and a vehicle axle.

With reference now to FIG. 6, a vehicle axle 154 is shown separated from the vehicle 10 (FIG. 1). The vehicle axle assembly 154 comprises an axle housing 156 that encloses a rotatable axle 104 (FIG. 4). The vehicle axle assembly 154 comprises axle assemblies 102 disposed at opposing ends of the axle housing 156. The axle assemblies 102 comprise the housing 106 that is pivotable about a steering axis 146. The housing 106 comprises steering knuckle 150 that is attached to a steering arm 148. The steering arm 148 is connected to a steering wheel 162 (FIG. 1) and pivots the housing 106 about the steering axis 146 in response to operation of the steering wheel.

The inboard drive hub 108 is attached to the axle and rotatable about the drive axis 63. The inboard drive hub 108 comprises a plurality of studs 140 spaced about the periphery of a hub plate 164. Spacer 138, comprising a ring having a plurality of spaced-apart holes 166 formed therein, is placed on the inboard drive hub 108 so that holes 166 align with studs 140 and the studs are disposed within a corresponding hole 166.

Track hub 60 comprises an inner set of holes 168 arranged in a circle about the track hub and configured to align with studs 140 so that each stud is disposed within one of the plurality of holes 168. Lug nuts 142 (FIG. 3) are threaded onto studs 140 to secure the track hub 60 and spacer 138 to the inboard drive hub 108 for rotation therewith about drive axis 63. Track hub 60 further comprises a plurality of bolts 62 positioned within holes 64 (FIG. 3) formed in the periphery of the track hub. Drive sprocket 32 is fastened to the track hub 60 using bolts 62 disposed within holes 170 formed in the drive sprocket and secured with a fastener such as nut 172 (FIG. 5). When assembled the drive sprocket 32 surrounds and is supported by the spacer 138. Fastening the drive sprocket 32 to the track hub 60 allows for transfer of the rotational force from the axle 104 (FIG. 4) through the inboard drive hub 108, spacer 138, and track hub to the drive sprocket 32 to drive movement of the endless track disposed about the drive sprocket and the first and second end rollers 36, 38.

Track hub 60 is configured to support hub 30 within hub housing 31. Hub 30 allows the track hub 60, spacer 138, drive sprocket 32, and inboard drive hub 108 to rotate freely relative to the track frame 28. Hub 30 is connected to the track frame 28 within the hub housing 31 using fasteners 174 such that a rolling-element bearing permits relative rotational movement between the frame 28 and the drive sprocket 32 about drive axis 63. However, limiter 98 may be used to limit the relative movement between the frame 28 and the axle assembly housing 106 to prevent over rotation of the track frame.

Limiter 98 is fastened to the inboard side 92 of track frame 28 using fasteners 100. In the embodiment of FIG. 6, the limiter is affixed to the inboard member of the track frame using three bolts disposed on a substantially vertical flange member 114. When attached to the track frame 28, the first wing 116 and second wing 118 of limiter are disposed on opposing lateral sides of housing 106 so that clockwise and counter-clock wise rotation of the track frame 28 is limited by the housing 106 engaging either the first wing or the second wing. As previously discussed, the first wing 116 and the second wing 118 of limiter 98 may be connected by bridges 120 to define a circular opening 110 within which the bottom side of housing 106 is disposed to limit movement of the track frame 28 relative to the axle assembly 102.

Figure 8:
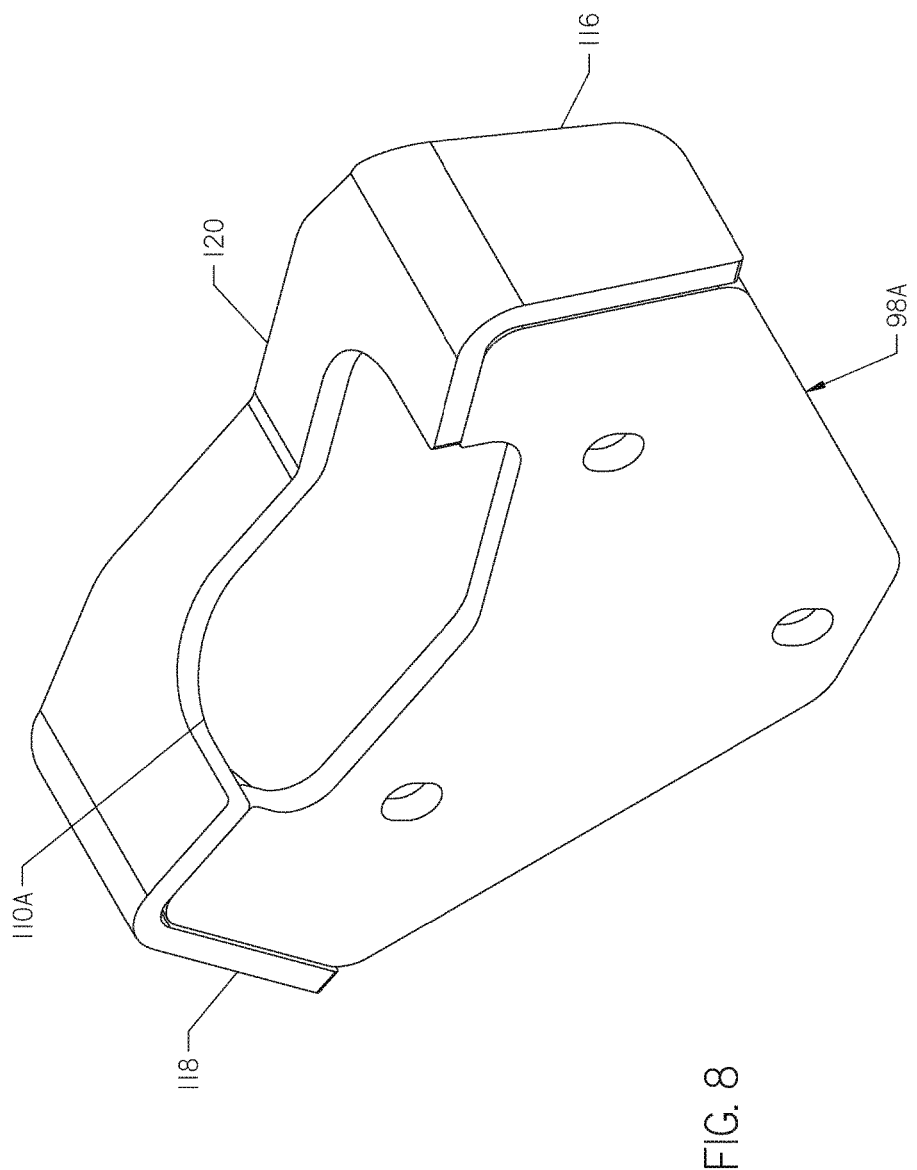
FIG. 8 is a perspective view of an alternative limiter for use with the track system of the present invention.

In a preferred embodiment shown in FIG. 8, limiter 98A may comprise a single bridge 120 disposed on an inboard side of the limiter to connect the first wing 116 and the second wing 118. Thus, in the embodiment of FIG. 8 the opening 110A is defined by the first wing 116, the second wing 118, and the bridge 120 and may comprise a generally "D" shape opening when viewed from above. The shape of limiter 98A allows the limiter to be attached to the inboard member 92 (FIG. 6) flush with the inner plate 152 of the inboard member. Thus, limiter 98A may differ from limiter 98 (FIG. 6) by elimination of an inner bridge 120 that overlaps the top edge of inner plate 152.

The bottom side of housing 106 is disposed within opening 110A so that it may engage the edge of the opening 110A to limit rotational movement of the track frame 28 relative to the housing. However, housing 106 is preferably disposed shallow enough within opening 110A such that it does not engage the vertical flange member 114 of the limiter. One skilled in the art will appreciate that limiters having openings of various shapes and sizes may be used to limit movement of the track frame relative to the housing 106 without departing from the spirit of the present invention.

Figure 7:
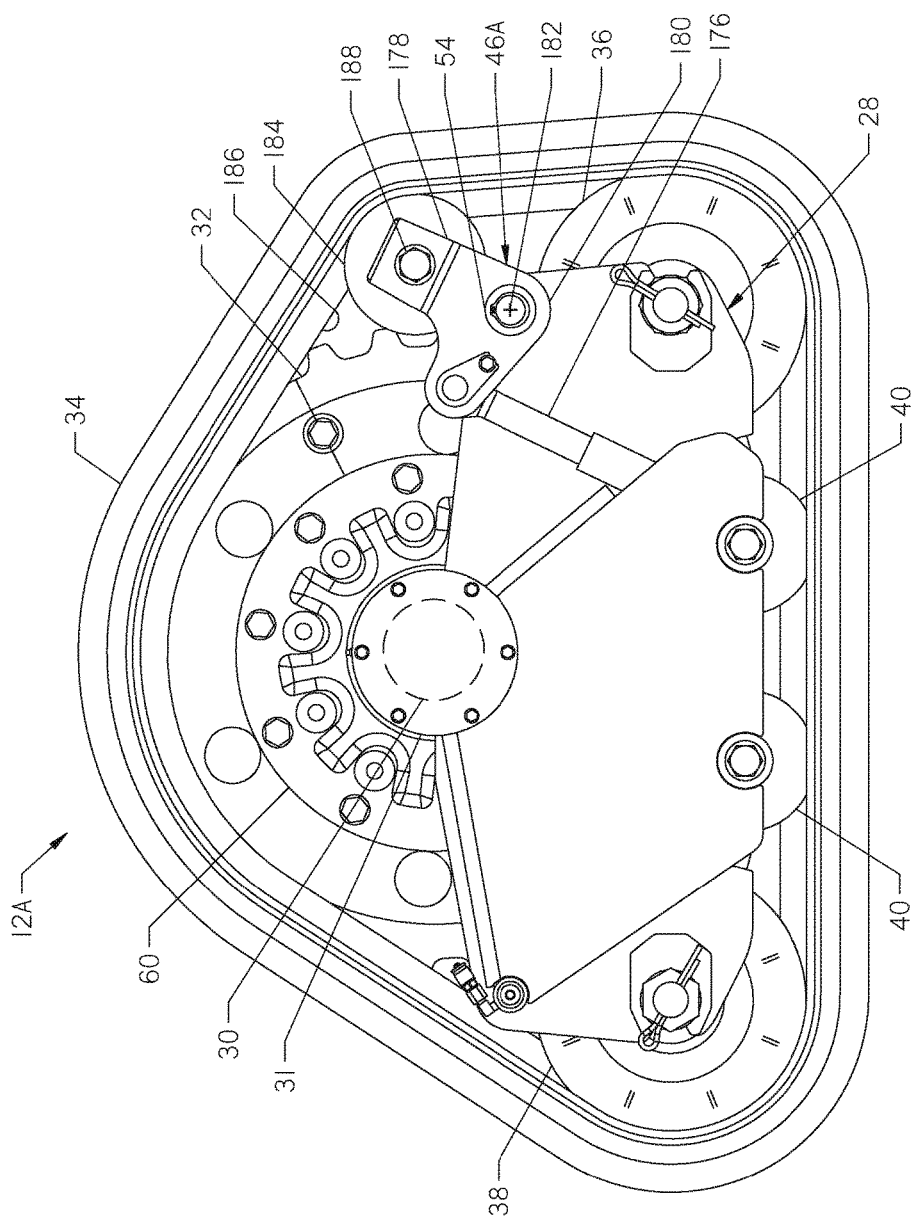
FIG. 7 is an outboard view of an alternative track system of the present invention having a quadrilateral profile.

With reference now to FIG. 7, an alternative track system 12A of the present invention is shown therein. Track system 12A comprises many of the same components discussed with reference to track system 12. Thus, a detailed description of components common to both track systems will not be repeated.

Track system 12A comprises track frame 28, first end roller 36, second end roller 38, and bogie rollers 40. Hub housing 31 is supported on the track frame 28 and houses hub 30. Drive sprocket 32 is connected to the hub 30 via track hub 60. Track system 12A also includes the spacer 138 (FIG. 6), inboard drive hub 108 (FIG. 6), and axle housing 102 (FIG. 6) used with track system 12. A limiter 98 (FIG. 6) or 98A (FIG. 8) as described herein is disposed on an inboard side of the drive sprocket 32 and supported on the inboard member of frame 28

Track system 12A differs from track system in the configuration of tension adjustment mechanism 46A. Tension adjustment mechanism 46A comprises a linear actuator 176 connected to the frame 28 at a first end and to a swing arm 178 at a second end. The swing arm 178 is connected to the track frame 28 at an elbow 180 and pivots about pivot point 182 when the actuator 176 is extended or retracted. Strut 54 may provide the connection point for swing arm 178 to the track frame 28. A tension wheel 184 is rotatably connected to the swing arm 178 at an end opposite the connection of the actuator 176 to the swing arm and engages an inner surface 186 of the track 34. Tension wheel 184 may be connected to the swing arm 178 using an axle 188 that extends across the frame 28 to the inboard side of the track system 12A. A similar second tension adjustment mechanism may be supported on the inboard member of the frame and connected to the axle 188 on an inboard side of the track system. The second tension adjustment mechanism includes a tension wheel 184, swing arm 178 and actuator 176. The inboard and outboard actuators may be connected in fluid communication, as previously discussed, to provide equal extension or retraction force on the inboard and outboard swing arms. Thus, in track system 12A the first end roller 36 is not connected to the tension adjustment mechanism 46A and is not used to adjust tension on the track 34. However, the use of tension adjustment mechanism 46A, as described herein, may alter the profile of track 34 from a substantially triangular profile (FIGS. 1-6) to a quadrilateral profile having rounded edges as shown in FIG. 7.

One skilled in the art will appreciate the variations that may be effective in this invention. For example, the housing

106 does not necessarily need to pivot about a vertical axis relative to the vehicle in the case of a skid steer vehicle. Further, while triangular and quadrilateral track systems are shown, other configurations of track system could benefit from the limiters discussed herein.

What is claimed is:

1. A track assembly, comprising:
   a rotatable drive sprocket having an axis of rotation;
   a hub drivingly engaged to the drive sprocket;
   a frame element connected to the hub, rotatable about the axis of rotation independently of the drive sprocket;
   an endless track supported on the drive sprocket and movable forward and rearward in response to rotation of the drive sprocket; and
   a limiter that defines an enclosure that at least partially surrounds an opening and is situated in underhanging relationship to the hub.

2. A vehicle comprising:
   a chassis;
   an engine supported by the chassis; and
   a plurality of track assemblies of claim 1 disposed in ground-engaging relationship and supporting the chassis.

3. The vehicle of claim 2 having four track assemblies.

4. The vehicle of claim 3 wherein two of the four track assemblies are the track assemblies of claim 1.

* * * * *